United States Patent Office 2,798,530
Patented July 9, 1957

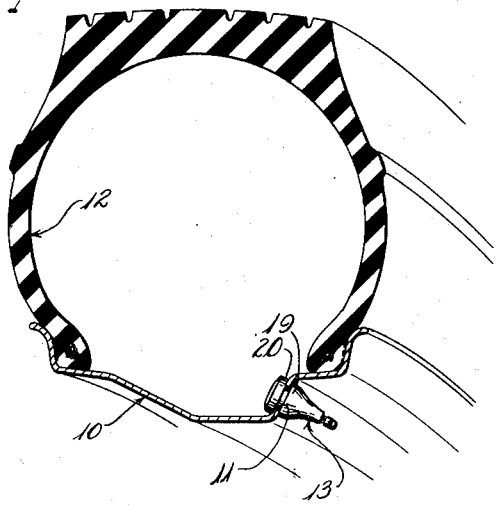
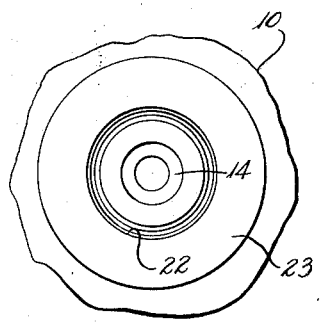
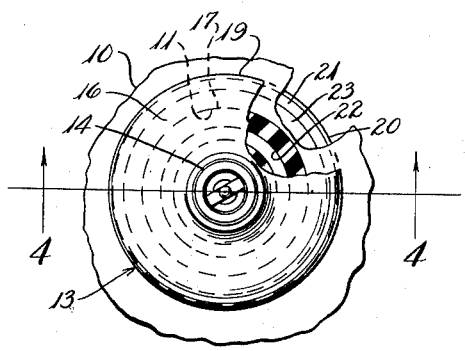
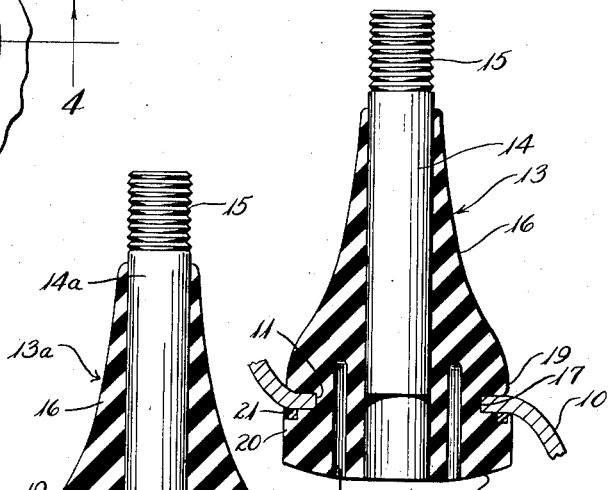
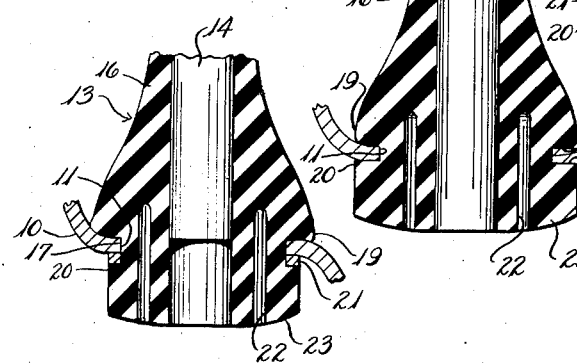
FIG-1, FIG-2, FIG-3, FIG-4, FIG-5, FIG-6
INVENTOR.
WILLIAM M. NONNAMAKER
BY W. A. Fraser
ATTY.

2,798,530

TUBELESS TIRE RIM AND VALVE

William M. Nonnamaker, Cuyahoga Falls, Ohio, assignor to The Firestone Tire & Rubber Company, Akron, Ohio, a corporation of Ohio Application February 12, 1954, Serial No. 409,841

1 Claim. (Cl. 152—427)

The present invention relates to valves for inflating tubeless tires, and it is particularly adapted for valves of the type which are removably attached to tire rims.

A tubeless tire of the type that requires the introduction of tire inflationary air through the tire rim has heretofore presented a serious problem in getting a fluid tight seal between the valve stem and the rim. One expedient has been to permanently attach the valve stem to the rim base as by welding or by any other means found satisfactory. Permanent attachment of the valve stem to the rim simplifies the problem of obtaining an air tight seal between the valve stem and the rim, but such constructions are not entirely satisfactory due to the fact that valve stems frequently become injured, and if the stem has been permanently attached to the rim, its replacement is frequently complicated. Means for replacing a permanently attached valve stem are generally not readily available to the user of the tire.

Another expedient has been to use a metal valve stem and rim nut of the type heretofore in common use for tire inner tubes and provide a rubbery washer about the stem between the tire rim and the valve base, the rubbery washer being so disposed that when the rim nut is tightened, the washer seals the rim valve hole about the valve stem. This latter expedient of using the rubbery washer has the advantage of making it convenient to remove and replace an injured valve stem, and presently is the most generally used means of attaching the valve stem to tubeless tire rims. However, rubber-like material is subject to gradual flow when under pressure and such a washer clamped between the base of a valve stem and a rim base does not provide a permanent seal, but requires tightenings of the clamping members from time to time in order to maintain an air tight seal. The users of tires with such valve stem and rim combination frequently neglect to keep the seals tight which results in slow leaks and under-inflated tires.

It is an object of the present invention to provide a valve stem and rim assembly for a tubeless tire, which stem is removably associated with the rim base in fluid tight relation therewith and is adapted to be snapped into operative position with the rim.

Another object of the invention is to provide a valve stem and rim assembly for a tubeless tire, which stem makes it possible to utilize the inner air pressure of an inflated tire to effect a positive seal between the valve stem and the side of a valve rim hole.

Another object of the invention is to provide a valve stem having a rigid metallic barrel with rubber-like material molded about and extending beyond the inner end thereof, which rubber is of a shape that adapts it to be drawn into the valve hole of a tire rim and make an air tight seal with the edges of the hole, and to mold into the rubber-like material a rigid anchor member so disposed as to prevent the disturbance of said seal when the valve stem is subjected to lateral pressure in service which occurs when the stem is struck with stones or having foreign objects pressed against the side of the stem.

Another object of the invention is to provide a valve stem and rim assembly for a tubeless tire, which stem makes it possible to utilize the inflationary air of the tire to effect a positive seal between the valve and the side of a rim valve hole, and to provide said stem with a rigid tubular barrel substantially the entire length of said stem to provide lateral stability to the stem whereby said seal remains undisturbed when said stem is struck with stones or subjected to lateral forces in service.

With the above and other objects in view, and to improve generally upon the details of such devices, the present invention consists of the construction and arrangement of parts hereinafter described, and illustrated in the accompanying drawing, in which:

Fig. 1 is a fragmentary perspective view, partly in section, of a valve, rim and tubeless tire assembly embodying the present invention illustrating the relative positions of said members;

Fig. 2 is a fragmentary view of Fig. 1 and being a top plan view of the valve partly broken away to better disclose the relative positions of the valve elements and the rim;

Fig. 3 is similar to Fig. 2 but being a plan view of the bottom of the valve;

Fig. 4 is a sectional view taken on line 4—4 of Fig. 3;

Fig. 5 is a view similar to Fig. 4 showing a modified form thereof; and

Fig. 6 is a view similar to Fig. 4 showing another modified form thereof.

Referring to the drawing in more detail, it will be seen by reference to Fig. 1 that the invention comprises a rim 10, having the usual rim valve hole 11, a tubeless tire 12 mounted on the rim and a valve stem referred to generally as 13 disposed in the rim valve hole.

Valve stem 13 comprises a rigid barrel portion 14 with an externally threaded end 15 to receive a valve cap not shown and to incase the usual inner tube valve core. Rubber or rubber-like material 16 is molded about and has a vulcanized adhesion to the inner end of barrel 14 as illustrated in the drawing. The rubber 16 extends a substantial distance beyond the inner end of barrel 14 and has a continuous recess 17 opening laterally outwardly and encircling the rubber's thickened body portion in a plane perpendicular to the axis of the said stem. The recess 17 has an axially outer surface 17a and an axially inner surface 17b, both surfaces being substantially perpendicular to the axis of the stem. The width of recess 17 is approximately equal to the thickness of rim 10 at the edge of valve hole 11. The bottom of recess 17 is adapted to contact the edge of said valve hole in fluid tight relation with said edge. The initial diameter of the bottom of recess 17 is preferably the same as the diameter of valve hole 11.

Stem 13 is inserted in the valve hole by manually forcing it into the position shown in Fig. 1. To facilitate the necessary passing of the rubber through the valve hole a sufficient distance to permit the edges of the rim hole to enter recess 17, the rubber 16 is molded with a tapered surface. The stem is inserted from the radial outer side of the rim with the small end of the tapered rubber entering the valve hole first and being forced therethrough until the leading lip 19 of the recess snaps over the edge of the valve hole at which time the stem 13 and the rim 10 will automatically occupy the relation shown in Fig. 4.

The lower lip 20 of recess 17 includes a relatively rigid ring 21 which may be composed of metal and may have a surface flush with a side of recess 17 or it may be embedded in the rubber 16 a short distance. In any event, the ring is permanently attached as by adhesion or embedment to the rubber and it is adapted to prevent tilting of valve stem 13 in hole 11 as will later be explained.

A continuous circular groove 22 extending longitudinally of and spaced a distance therefrom is molded into rubber 16 and opens at the inner end of said rubber so as to communicate with the tire inflationary air when the said assembly is in service. Groove 22 extends longitudinally of the stem 13 beyond recess 17 and it will be seen by reference to Fig. 4 and Fig. 3 that the radially outer side of groove 22 is formed of a substantially cylindrical radially expandible collar 23 of the rubber 16.

In use, valve stem 13 is attached to the rim before the tire 12 is mounted. The valve stem is inserted manually, as indicated above, by the threaded end of the stem being first projected through the valve hole 11 and the stem forced through the hole until the rubber adjacent recess 17 snaps over the edges of the rim about the valve hole.

In the particular embodiment of the invention shown in Fig. 4, it is to be noted that the barrel 14 terminates approximately even with recess 17. The entrance of stem 13 into the valve hole is facilitated by pulling on its outer end which stretches the rubber body somewhat resulting in decreasing its diameter. When the edges of the valve hole enter recess 17 and the pull on the stem is released, the rubber returns to its unstretched condition.

Next the tire is mounted and inflated through valve stem 13 in the usual manner. The relative dimensions of recess 17 and the valve hole 11 and the thickness of the rim base about said valve hole are such that the bottom of recess 17 will fit snugly against the edges of the valve hole. Initially such contact of the bottom of recess 17 against the edges of the valve hole may be sufficient to provide an air tight seal. It has been found, however, that if an initial air tight seal is formed, as just described, that after a short period of service the pressure of the bottom of said recess against the edge of the valve hole is lost or decreases, due to the flow of the rubber away from the pressure area, to an extent that permits the inflationary air of the tire to escape. To overcome this, applicant provided grooves 22 which expose its radial outer side formed by collar 23 to the internal fluid pressure of the tire. Since groove 22 extends beyond the bottom of recess 17 which is in contact with the sides of the valve hole, it will be seen that the collar 23, being formed of stretchable rubber, will be forced radially outwardly against the edges of the valve hole with substantially such force as the internal fluid pressure of the tire exerts on the area of groove 22 that lies outside the rim valve hole. It will be seen that the bottom of the recess 17 will remain in forcible contact with the side of the valve hole so long as the tire 12 is inflated. It is to be noted that the force of the inflationary pressure is a continuing force which will compensate for any flow or movement of rubber away from its contact with the edge of the valve hole. By this follow-up feature, a serious fault of prior snap-in type valves is corrected.

Heretofore, snap-in valves similar to the construction shown in Fig. 4, in that a recess of the nature of applicant's recess 17 was used, to attach the valve stem to the edges of the valve rim hole has not proven entirely satisfactory because of the ease with which the valve stem could be pressed sidewise which movement resulted in separating the rubber from the rim sufficient to permit air to escape. In operation, such sidewise movement of a stem occurs when struck by a stone or the stem may remain pressed to one side for a long period by the valve's contact with stones, sticks, or objects that remain pressed against the valve stem when a tire is standing still. While the follow up air pressure by applicant's construction as described above will substantially eliminate the possibility of air escaping that may result due to the stem being pushed sidewise, applicant has found that additional protection against such misplacement of the valve is desirable and he has provided a solution comprising the embedding of a rigid ring 21 in the lip 20 of the recess 17 as will be seen by reference to Fig. 4. Since the threaded end 15 of the valve barrel 14 is the first portion of the stem 13 that enters the valve hole, it will be seen that it is unnecessary for the ring 21 to pass through the valve hole and when the sides of the valve hole are snapped into recess 17, ring 21 is disposed directly against the rim, or separated from the rim by a thin layer of rubber, in case ring 21 is completely embedded a short distance below the surface of the sides of said recess. At any rate, ring 21 lying adjacent to the rim about the valve hole provides lateral stability to stem 13.

It so happens that when valve stem 13 is used in certain sizes of drop-center passenger car rims that a portion of the valve hole in the rims will be disposed close to or through a curved portion of the rim. Since only a very short distance of the curved portion of the rim is involved, it has been found desirable to use a rigid ring 21 of a smaller diameter so that the ring will press against a flat surface of the rim. A smaller diameter ring 21 is illustrated in Fig. 5 wherein it will be noted that one side of recess 17 has been shortened. The reason for this is to facilitate molding the small diameter ring in the rubber about the valve stem. It will be seen, by those familiar with the art, that a mold suitable for molding the rubber of the structure of Figs. 4 and 5 provides a ledge on which the rings 21 may be seated preparatory to molding. It is to be understood that the structure shown in Fig. 5 differs from that shown in Fig. 4 only by the depth of the recess in which the edges of the valve hole are seated and the inner end of the rubber of the valve being of slightly less diameter. Once installed in operative position, structures of Figs. 4 and 5 function in the same way.

Referring to Fig. 6, it will be seen that another modification of the structure of Fig. 4 is shown and consists of extending a rigid barrel portion 14a the entire length of a valve stem 13a which makes possible the elimination of the rigid ring 21 shown in Fig. 4. It is to be understood that the structure shown in Fig. 6 is the same as that of Fig. 4 except for element 14a and the omission of ring 21 as will be seen by reference to the drawings. Applicant has found that the embodiment of the invention shown in Fig. 6 is an improvement over the prior art structures and works satisfactorily in all but the most severe service such as where tires are run in soft soil or such service where the lateral forces to which the stem is subjected may be excessive. This useful improvement in lateral stability results from the increased length of barrel 14a relative to the rubber over the relative length of the barrel 14 of Fig. 4.

In the embodiments of the invention specifically illustrated in the drawing, the groove 22 extends axially of the stem beyond the axially outer surface 17a of the recess 17. However, in order to obtain the benefits of the invention, it is only necessary that the groove 22 extend axially of the stem at least to a point lying in the plane of the axially outer surface 17a of the recess 17.

The detailed description of the particular embodiments of the invention illustrated and described herein is not to be construed as limiting the invention thereto. The invention includes all features of patentable novelty residing in the foregoing description and the accompanying drawing.

What is claimed is:

A valve stem construction for a tubeless pneumatic tire rim comprising a rubbery body portion adapted to project through and a distance radially outwardly of a rim valve hole and to fit against both sides of the edge thereof, a longitudinal air passageway through the stem, a rigid ring in and permanently attached to said rubber body concentric with said passageway, said ring being larger in diameter than the rim valve hole and disposed in that portion of said body that fits against the side of the edge portion of the rim valve hole that faces radially outwardly of a rim in which said valve hole is located and abutting said side of the rim, groove means in said body disposed circumferentially about and spaced radially from one end portion of said passageway and opening on the end of the body which projects radially outwardly of said rim valve hole, said groove means communicating with tire inflationary air when said rim and valve are in service with an inflated tubeless tire mounted on said rim, said groove means extending in depth axially of said body a distance beyond the portion thereof that fits against the sides of said valve hole.

References Cited in the file of this patent

UNITED STATES PATENTS

| | | |
|---|---|---|
| 2,049,252 | Eberhard | July 28, 1936 |
| 2,272,886 | Wilson | Feb. 10, 1942 |
| 2,553,627 | Barlow | May 22, 1951 |
| 2,634,785 | Tubbs | Apr. 14, 1953 |
| 2,649,271 | Gooselin | Aug. 18, 1953 |